United States Patent
Tobin

(10) Patent No.: US 7,182,970 B2
(45) Date of Patent: Feb. 27, 2007

(54) BEVERAGE BREWING SYSTEM AND METHOD FOR BREWING A BEVERAGE

(75) Inventor: John William Tobin, Hillsdale, NJ (US)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 46 days.

(21) Appl. No.: 10/027,848

(22) Filed: Dec. 20, 2001

(65) Prior Publication Data

US 2003/0116025 A1 Jun. 26, 2003

(51) Int. Cl.
*A23F 3/00* (2006.01)

(52) U.S. Cl. ............... 426/597; 426/590; 426/435; 426/594; 426/433

(58) Field of Classification Search ............ 426/597, 426/433, 435, 590, 594
See application file for complete search history.

(56) References Cited

U.S. PATENT DOCUMENTS

| | | | | |
|---|---|---|---|---|
| 2,204,896 | A | * | 6/1940 | Kappenberg ............ 426/330.3 |
| 2,338,608 | A | * | 1/1944 | Weisberg et al. ............ 426/434 |
| 2,559,194 | A | * | 7/1951 | Marion ........................ 426/597 |
| 2,863,775 | A | * | 12/1958 | Perech |
| 2,975,057 | A | * | 3/1961 | Seltzer et al. |
| 3,040,647 | A | * | 6/1962 | Gluckstein et al. ........... 99/275 |
| 3,532,505 | A | * | 10/1970 | Cornelius ................... 426/506 |
| 3,641,918 | A | | 2/1972 | Schellgell et al. |
| 3,700,463 | A | * | 10/1972 | Bolt et al. ................... 426/433 |
| 4,015,749 | A | | 4/1977 | Arzberger et al. |
| 4,550,651 | A | * | 11/1985 | Haynes ........................ 99/279 |
| 4,552,776 | A | * | 11/1985 | Tse ............................ 426/597 |
| 4,757,752 | A | * | 7/1988 | Robins et al. ................ 99/279 |
| 4,809,594 | A | | 3/1989 | Vitous |
| 4,920,871 | A | * | 5/1990 | Anson et al. ................. 99/295 |
| 5,529,796 | A | | 6/1996 | Gobbo et al. |
| 5,584,229 | A | * | 12/1996 | Anson ........................ 99/280 |
| 5,980,969 | A | | 11/1999 | Mordini et al. |
| 6,120,825 | A | * | 9/2000 | Cirigliano et al. .......... 426/435 |
| 6,135,009 | A | | 10/2000 | Lassota |
| 2002/0074350 | A1 | * | 6/2002 | Jones et al. ............. 222/146.5 |
| 2002/0130137 | A1 | * | 9/2002 | Greenwald et al. .......... 222/54 |

FOREIGN PATENT DOCUMENTS

| | | |
|---|---|---|
| EP | 0 552 519 | 10/1995 |
| JP | 4-45745 | * 2/1992 |
| WO | 01/65985 | 9/2001 |

OTHER PUBLICATIONS

International Search Report claiming priority on PCT/EP02/13005 mailed Feb. 24, 2003.

* cited by examiner

*Primary Examiner*—Anthony Weier
(74) *Attorney, Agent, or Firm*—Edward A. Squillante, Jr.

(57) ABSTRACT

The invention is directed to a beverage brewing system and method for brewing a beverage. The brewing system is equipped to heat beverage extracts prior to mixing the beverage extract with solvent. The method results in a beverage, such as a tea-based beverage, that has no visible undissolved beverage extract.

7 Claims, 3 Drawing Sheets

BEVERAGE BREWING SYSTEM AND METHOD FOR BREWING A BEVERAGE

FIELD OF THE INVENTION

The present invention is directed to a beverage brewing system and a method for brewing a beverage. More particularly, the present invention is directed to a brewing system having a means for heating a beverage extract, whereby the beverage extract is heated to above about ambient temperature before being mixed with water in the beverage brewing system. The present invention is also directed to a method for making a substantially homogeneous beverage.

BACKGROUND OF THE INVENTION

Methods for the preparation of instant beverages, like instant tea beverages, are known. For example, many food establishments have brewing systems that dispense tea-based beverages ready for consumption. Typically, such systems operate by mixing a tea extract or component with hot water to produce a hot composition that is combined with cold water to thereby produce a tea beverage that is ready to drink.

Unfortunately, however, when preparing such tea beverages, the tea beverages that are produced by conventional tea brewing systems are not always homogeneous. For instance, many conventional tea-brewing systems produce tea beverages having, suspended therein, particles of undissolved extract. Tea beverages with undissolved particles do not look very desirable to the consumer, and almost invariably, do not taste as good as a substantially homogenous tea (i.e., a tea having fully dissolved extract).

It is of increasing interest to develop a beverage brewing system and method for brewing a beverage that result in a substantially homogeneous beverage. This invention, therefore, is directed to a beverage brewing system and method for brewing a beverage that employ a heating means to heat extract prior to mixing the extract with water to thereby produce a substantially homogenous beverage.

ADDITIONAL INFORMATION

Efforts have been disclosed for making beverages. In U.S. Pat. No. 5,529,796, a process for making ready to drink tea is described.

Other efforts have been disclosed for brewing beverages. In U.S. Pat. No. 6,135,009, a beverage brewing system on a serving cart assembly is described.

Still other efforts have been disclosed for brewing beverages. In World Application WO 01/65985, a brewing device having automatic and semi-automatic brewing modes is described.

Even other efforts have been disclosed for making beverages. In European Patent No. 0 552 519 B1, improvements directed at tea processing are described.

None of the references above describe a beverage brewing system or method for making a beverage wherein an extract is heated prior to being mixed with a solvent, like water.

SUMMARY OF THE INVENTION

In a first aspect, the present invention is directed to a beverage brewing system comprising:
(a) a conduit for supplying a heated solvent;
(b) a conduit for supplying a heated beverage extract into the heated solvent;
(c) a mixing conduit to receive the heated solvent and heated extract; and
(d) optionally, a conduit for supplying solvent that has not been heated into a mixture conduit.

In a second aspect, the present invention is directed to a method for brewing a beverage with the system of the first aspect of the invention.

In a third aspect, the present invention is directed to a beverage made via the method for brewing the beverage of the second aspect of the invention.

Beverage, as used herein, is defined to mean a liquid composition that a consumer may drink, either hot or cold. Beverage, therefore, is meant to include liquid compositions like tea-based beverages, as well as soup. Substantially homogeneous beverage is defined to mean a beverage which is translucent and having no visible particles of undissolved extract. Mixing conduit is defined to include a portion of conduit in the area where the conduit for supplying heated solvent and the conduit for supplying heated beverage extract meet.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
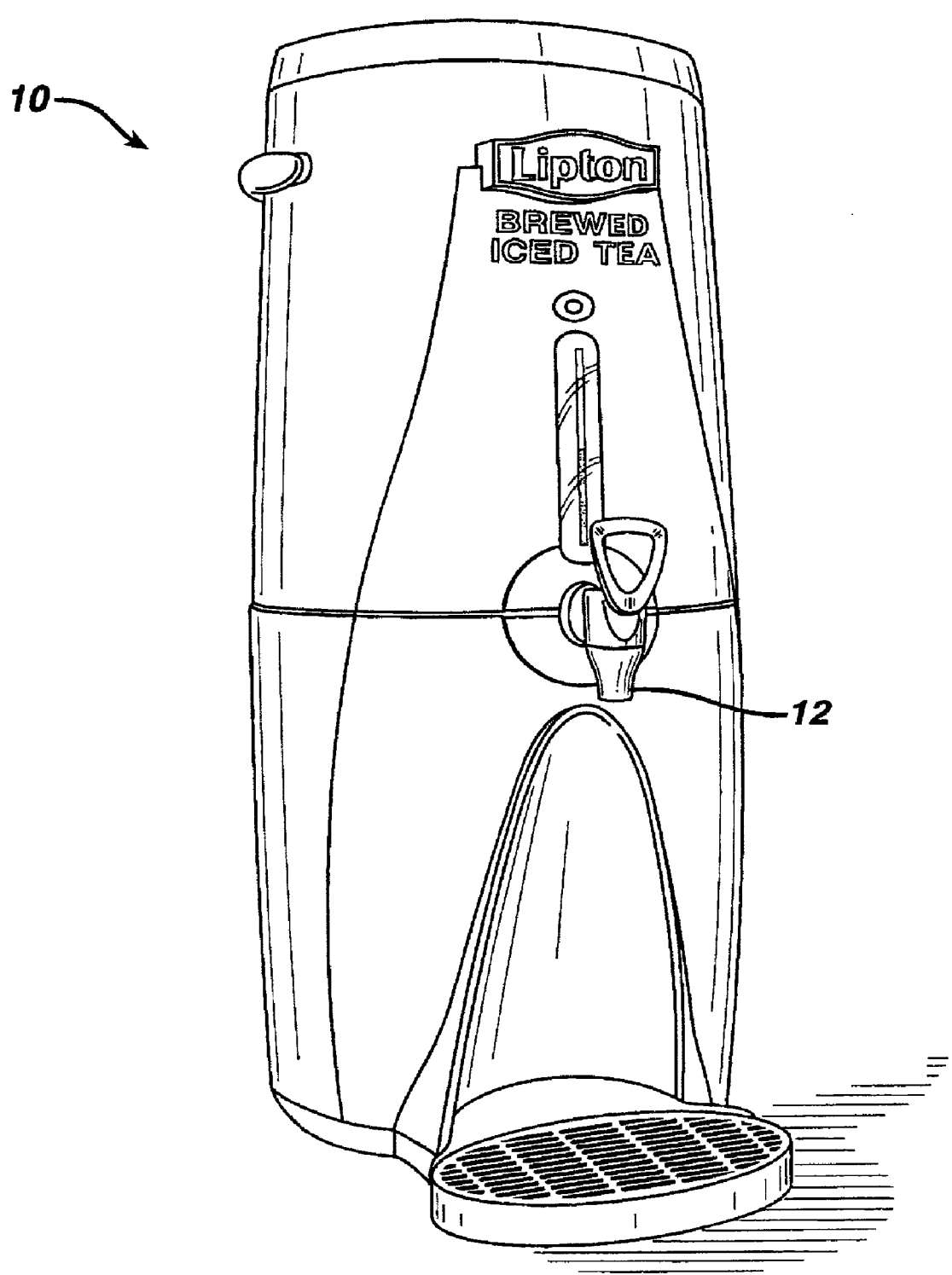
FIG. 1 is a drawing of a type of brewing machine that can comprise the brewing system of the present invention.

There is no limitation with respect to the heated solvent that may be used in this invention other than that the heated solvent is one which may be used in a beverage suitable for human consumption. Such a heated solvent includes milk, juice, broth, water, mixtures thereof, and the like. In a preferred embodiment, however, the heated solvent is water.

Regarding the temperature of the heated solvent used in the present invention, typically, the temperature is from about 40 degrees centigrade to about 100 degrees centigrade, and preferably, from about 45 degrees centigrade to about 95 degrees centigrade, and most preferably, from about 75 degrees centigrade to about 90 degrees centigrade, including all ranges subsumed therein.

The conduit for supplying the heated solvent is limited only to the extent that the conduit can carry or supply the heated solvent in a beverage brewing system. Such a conduit may be made of materials comprising copper, galvanized metal, polycarbonate, polyamide, polyester, olefins, stainless steel and the like. In a most preferred embodiment, however, the conduit for supplying the heated solvent is stainless steel, whereby the diameter of the conduit is from about 0.2 cm to about 2.0 cm, and preferably, from about 0.3 cm to about 1.50 cm, and most preferably, from about 0.4 cm to about 1.30 cm, including all ranges subsumed therein.

The extract (to be heated) that may be used in the beverage brewing system of the present invention is limited only to the extent that it is one which may be used to make a beverage suitable for human consumption. Such an extract can be one that is used to make a fruit flavored beverage such as lemonade, a soup, like chicken soup, or a tea-based beverage. In an especially preferred embodiment, however, the extract is one which may be used to make a tea-based beverage whereby the extract (i.e., preferably at least about 50.0% by weight solids) for making the tea-based beverage is made available from suppliers like Unilever-Bestfoods, under the general category of Lipton Tea Extracts. Moreover, the extract, once heated, is typically at a temperature from about 40 degrees centigrade to about 100 degrees centigrade, and preferably, from about 45 degrees centigrade to about 95 degrees centigrade, and most preferably, from about 75 degrees centigrade to about 90 degrees centigrade, including all ranges subsumed therein.

Regarding the conduit that may be used to supply or deliver the heated beverage extract of the present invention, such a conduit is made of materials similar to the ones described for delivering the heated solvent. In an especially preferred embodiment, however, the conduit that supplies the heated beverage extract has an outside diameter that is less than the inside diameter of the conduit for supplying heated solvent.

The solvent that has not been heated and that is optionally supplied in the beverage brewing system of the present invention is typically any liquid that may be used in a beverage. Preferably, the liquid is water and at a temperature from about 2.0 degrees centigrade to about 30.0 degrees centigrade, and most preferably, water at about the temperature of tap water. As to the conduit that may be used to supply or deliver solvent that has not been heated, such a conduit is also made of materials similar to those described for delivering the heated solvent.

Turning to the figures, FIG. 1 shows a beverage brewing machine 10 comprising the beverage brewing system of the present invention (not shown). The beverage brewing machine 10 may be used, for example, to dispense a tea-based beverage (not shown) from exit port 12.

Figure 2:
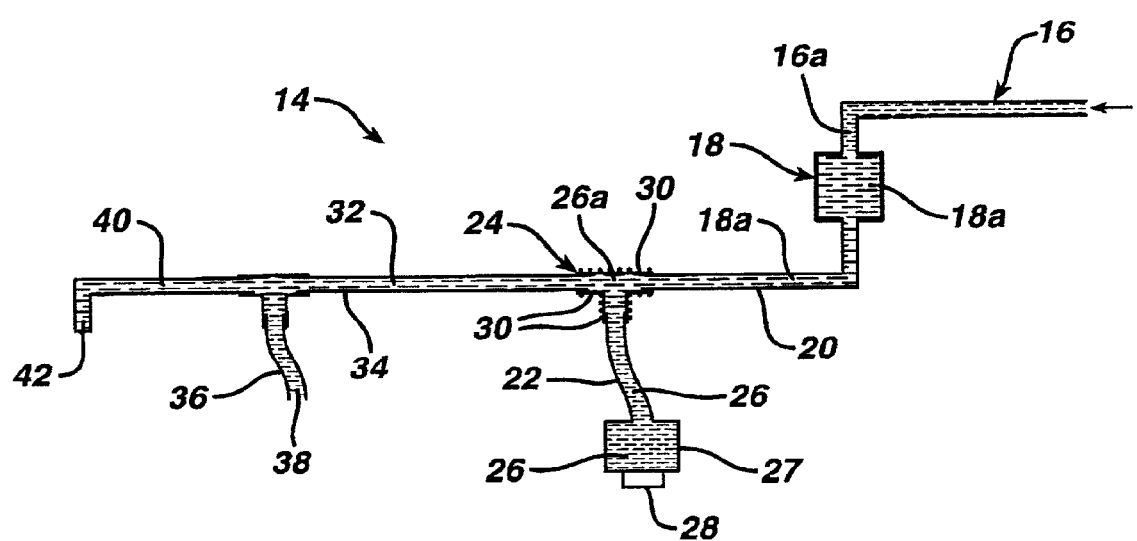
FIG. 2 is an illustrative schematic diagram of the brewing system of the present invention.

FIG. 2 depicts an illustrative schematic diagram of the brewing system 14 of the present invention which may be found within the beverage brewing machine 10, the brewing system 14 being fed solvent from, for example, a storage container having a pump, or from tap (both not shown). Solvent feed conduit 16 supplies, for example, feed solvent (e.g., water) 16a to solvent heater tank 18 to produce heated solvent 18a. Conduit for supplying heated solvent 20 joins, for example, with conduit for supplying heated beverage extract 22 at mixing conduit 24. Non-heated extract 26, in extract reservoir 27, is pumped, via food grade pump 28, through conduit for supplying heated beverage extract 22 which comprises a heating means 30 (which is of a size to ensure that the non-heated extract is heated to about the temperature of the heated solvent) which surrounds (jackets) or is positioned near the conduit for supplying heated beverage extract 22 and heats the non-heated extract 26 to produce heated extract 26a which mixes with heated solvent 18a in mixing conduit 24 to produce a heated solvent and heated extract mixture 32. The mixture 32 is transported via mixture conduit 34 where conduit for supplying solvent that has not been heated 36 optionally supplies non-heated solvent 38 (supplied from a storage container having a pump, or tap, both not shown) into mixture 32 to produce a beverage 40 ready to be discharged at opening 42 by way of exit port 12.

Figure 3:
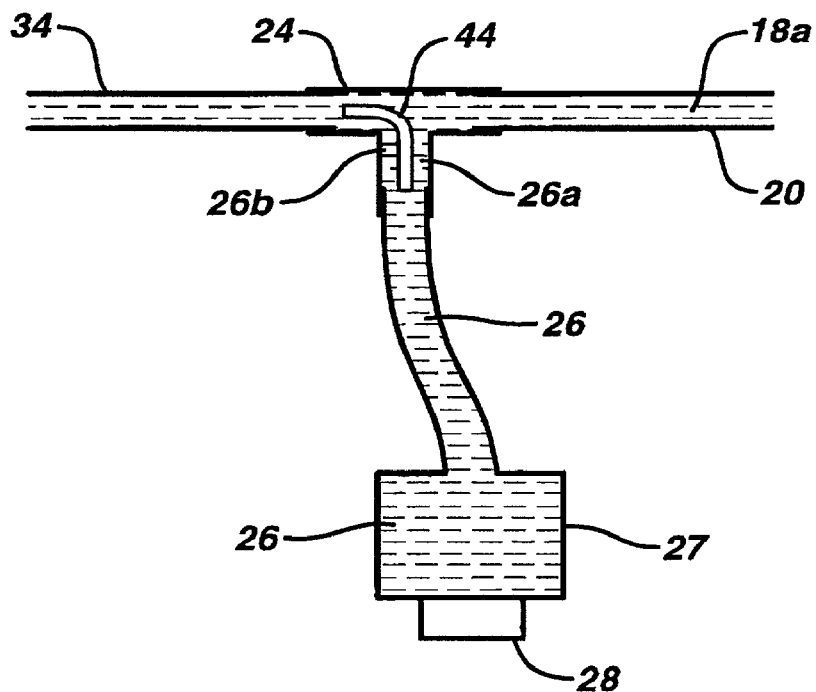
FIG. 3 depicts a portion of the brewing system of the present invention with a metal heating means that comes into contact with heated solvent.

FIG. 3 shows heating means 44 placed within conduit for supplying heated beverage extract 22 and mixing conduit 24. Heating means 44 may be used, for example, in lieu of or addition to heating means 30, and is of a length and width (or diameter) to ensure that enough heat is passed to the non-heated extract to heat the same to about the temperature of the heated solvent.

Regarding the heating means illustrated by heating means 30 and heating means 44, the former attaches to the conduit for supplying heated beverage extract 22 and can comprise heating coils surrounded by insulation whereby current is fed to the heating coils to heat the conduit for supplying heated beverage extract 22 to thereby heat non-heated extract 26 to produce heated extract 26a. The latter is typically a metal, like a stainless steel rod or pipe that may be heated by supplying it with current and also, by contacting it with heated solvent 18a if desired. Heating means 44 attached to conduit 22 with a fixing means 26b (which may be a screw or bracket) may be solid such that heated extract 26a surrounds it, or hollow such that heated extract may surround and go through heating means 44. It is noted herein that heating means 30 may be moved anywhere within the brewing system 14, as long as non-heated extract 26 is heated by the same. Therefore, heating means 30 may, if desired, be moved closer to or around extract reservoir 27. It is further noted that since heating means 44 is supplied with current (e.g., from current coming into beverage brewing machine 10), it may be moved within the brewing system 14 to any position that will allow for non-heated extract 26 to become heated. Therefore, for example, heating means 44 is shown in FIG. 3 positioned with a portion in mixing conduit 24 and a portion in conduit for supplying heated beverage extract 22. This position is especially preferred when heated solvent 18a is one of the sources of heat to heating means 44. Such a position, however, is not required and heating means 44, the heating means 44 may be placed within, for example, the conduit for supplying heated beverage extract 22, the extract reservoir 27, or both.

Figure 4:
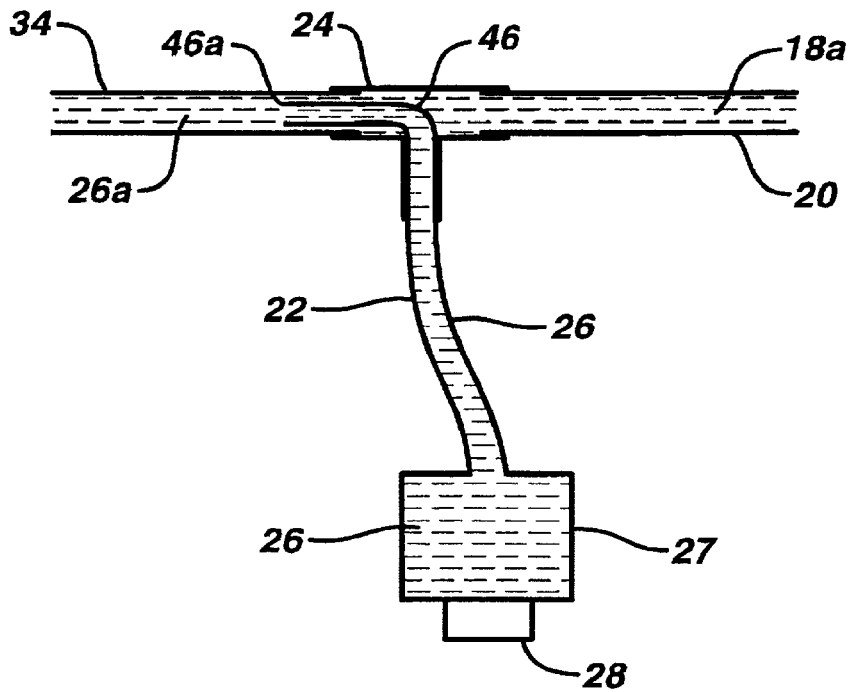
FIG. 4 depicts a portion of the brewing system of the present invention wherein the heating means is a portion of the conduit for supplying heated beverage extract.

FIG. 4 depicts an especially preferred embodiment of present invention whereby the heating means 46 is an extension or portion of the conduit for supplying heated extract 22 that extends into mixing conduit 24. Heated solvent 18a heats heating means 46 which in turn conducts heat through conduit for supplying heated extract 22 to heat non-heated extract 26 to produce heated extract 26a which may be passed through heating means exit 46a prior to being mixed with heated solvent 18a.

It is noted herein that FIG. 4 illustrates that heating means 46 may eject or expel heated extract 26a in the direction of heated solvent 18a. Optionally, however, heating means 46 may eject heated extract 26a against the direction of heated solvent 18a (not shown) in addition to or in lieu of ejecting heated extract 26a in the direction of heated solvent 18a.

The amount of heating means 46 extending into heated solvent 18a is limited only to the extent that enough of the heating means 46 contacts the heated solvent 18a such that non-heated extract 26 can be transformed in to a heated extract 26a having a temperature that is at about the temperature of the heated solvent 18a. Moreover, the heating means 46 can be coiled (not shown) or have heating fins applied thereon (not shown) in order to increase the surface area of the heating means 46 to allow greater contact with heated solvent 18a.

When making a beverage, like a tea-based beverage, with the system of the present invention, the beverage typically comprises at least about 80.0%, and preferably, at least about 85.0%, and most preferably, at least about 90.0% by weight total solvent (i.e., total solvent being the total amount of heated and non-heated solvent), the balance of the total weight of the beverage comprising no less than about 0.1% by weight extract, and preferably, no less than about 1.0% by weight extract. The total amount of solvent used can comprise 100.0% heated solvent, but preferably comprises less than about 45.0%, and most preferably, less than about 30.0% by weight heated solvent and at least 1.0% by weight heated solvent. Moreover, the beverage typically exits the beverage brewing machine from the exit port at a flow rate from about 1.0 to about 5.0, and preferably, from about 1.5 to about 4.0, and most preferably, from about 2.0 to about 3.0 fluid ounces/second, including all ranges subsumed therein.

Sweeteners (e.g., sugar), ice or both may be added to the beverage via any conventional means at amounts conventionally found in beverages suitable for consumption by humans.

The following Example is provided to facilitate an understanding of the present invention. The Example is not intended to limit the scope of the invention.

EXAMPLE

Conduit for supplying heated beverage extract may be submerged in a vessel of hot water. Tea extract may be heated by pumping the extract through the conduit for supplying heated beverage extract which is submerged in the hot water. About 1.0% by weight of heated extract, which may be heated to about 80 degrees centigrade, may be pumped and mixed with about 20.0% by weight water at about 80 degrees centigrade and about 80.0% by weight water at about tap water temperature to produce a tea-based beverage. The resulting tea-based beverage will be substantially homogeneous and free of visible particles of undissolved extract. Moreover, the tea-based beverage made via the present invention will look more appealing and taste better than tea-based beverages that have not been made by first heating the tea extract.

The invention claimed is:

1. A method for making a beverage comprising the steps of:
   (a) heating a beverage extract comprising at least about 50.0% solids within a beverage brewing machine to a temperature from about 75° C. to about 90° C. by contacting the beverage extract with a heating means placed within the beverage extract to produce a heated beverage extract; and
   (b) mixing the heated beverage extract with a heated solvent to produce a beverage on demand
   wherein the heating means is heated with electrical current or the heating means is heated with the heated solvent, or both wherein the beverage comprises less than about 45.0% by weight heated solvent.

2. The method for making a beverage according to claim 1 wherein the heated beverage extract is a tea extract.

3. The method for making a beverage according to claim 1 wherein the heated solvent is water.

4. The method for making a beverage according to claim 1 wherein the beverage is translucent and does not comprise visible particles of extract.

5. The method for making a beverage according to claim 1 wherein the beverage comprises at least about 0.1% by weight extract.

6. The method for making a beverage according to claim 1 wherein the heating means comprises a metal rod or pipe.

7. The method for making a beverage according to claim 1 wherein the beverage brewing machine is a machine for dispensing tea.

* * * * *